United States Patent
Pavlik, Jr. et al.

(10) Patent No.: US 6,174,509 B1
(45) Date of Patent: Jan. 16, 2001

(54) PURE FUSED SILICA, FURNACE AND METHOD

(75) Inventors: Robert S. Pavlik, Jr.; Daniel R. Sempolinski, both of Painted Post; Michael H. Wasilewski, Corning, all of NY (US)

(73) Assignee: Corning Incorporated, Corning, NY (US)

( * ) Notice: Under 35 U.S.C. 154(b), the term of this patent shall be extended for 0 days.

(21) Appl. No.: 09/125,208
(22) PCT Filed: Feb. 11, 1997
(86) PCT No.: PCT/US97/01681
  § 371 Date: Aug. 13, 2000
  § 102(e) Date: Aug. 13, 2000
(87) PCT Pub. No.: WO97/30933
  PCT Pub. Date: Aug. 28, 1997

Related U.S. Application Data
(60) Provisional application No. 60/011,997, filed on Feb. 21, 1996.

(51) Int. Cl.[7] .............................. C03B 5/43; C03B 33/12; C03B 35/02
(52) U.S. Cl. ...................... 423/337; 65/374.23; 422/240; 501/106
(58) Field of Search ................................. 423/335, 337, 423/338; 65/374.13; 501/103, 106; 422/425

(56) References Cited

U.S. PATENT DOCUMENTS

| 2,239,551 | * | 4/1941 | Dalton et al. |
|---|---|---|---|
| 2,272,342 | * | 2/1942 | Hyde . |
| 3,698,936 | * | 10/1972 | Moltzan ............................ 117/105.12 |
| 4,552,576 | * | 11/1985 | Hara et al. ................................. 65/2 |
| 4,804,422 | * | 2/1989 | Papanikolau et al. ................. 134/28 |
| 4,956,059 | * | 9/1990 | English et al. ........................ 423/335 |
| 5,043,002 | * | 8/1991 | Dobbins et al. ..................... 423/336 |
| 5,219,807 | * | 6/1993 | Paulica et al. ........................ 501/132 |
| 5,322,827 | * | 6/1994 | Michael et al. ...................... 501/132 |
| 5,332,702 | * | 7/1994 | Sempolinski et al. ............... 501/106 |
| 5,395,413 | * | 3/1995 | Sempolinski et al. ............... 423/330 |
| 5,688,477 | * | 11/1997 | Wel ....................................... 423/489 |

FOREIGN PATENT DOCUMENTS

| 936790 | 11/1973 | (CA) | ................................... 148/1 |
| 54-134551 | * 10/1979 | (JP) | ................................... 65/444 |
| 54-160414 | * 12/1979 | (JP) | ................................... 65/17.4 |

OTHER PUBLICATIONS

Hosman, Charles, Editor, Handbook of Chemistry & Physics Chemical Rubber Co Cleveland OH 1961. pp. 526–527, 588–589 592–593 674–675 2375–2386.*

* cited by examiner

*Primary Examiner*—Gary P. Straub
(74) *Attorney, Agent, or Firm*—Milton M. Peterson

(57) ABSTRACT

An article of relatively pure silica, and a furnace and method of producing the article. The article is produced by collecting molten silica particles (24) in a refractory furnace in which at least a portion of the refractory has been exposed to a halogen-containing gas to react with contaminating metal ions in the refractory.

10 Claims, 1 Drawing Sheet

PURE FUSED SILICA, FURNACE AND METHOD

This application claims the benefit of U.S. Provisional application Ser. No. 60/011,997, express mailed Feb. 21, 1996, entitled PURE FUSED SILICA, FURNACE AND METHOD, by Robert S. Pavlik, Jr., Daniel R. Sempolinski and Michael R. Wasilewski.

FIELD OF THE INVENTION

An article of relatively pure fused silica, and a furnace and method for producing the article.

BACKGROUND OF THE INVENTION

Relatively pure metal oxides are produced by thermal decomposition of precursors and deposition of the resulting oxides. The precursor may take the form of a vapor, or may be carried by a vapor. It may be decomposed by either flame hydrolysis or pyrolysis.

One such process is production of fused silica by hydrolysis or pyrolysis of silicon tetrachloride. Early patents disclosing such processes for producing silica are U.S. Pat. Nos. 2,239,551 (Nordberg) and 2,272,342 (Hyde). A commercial application of flame hydrolysis involves forming and depositing particles of fused silica to form large bodies (boules). Such boules may be used individually, or may be finished and integrated together into large optical bodies, such as telescope mirrors. In this procedure, $SiCl_4$ is hydrolyzed, and the hydrolyzed vapor is passed into a flame to form molten particles of fused silica. The particles are continuously deposited on a bait, or in a crucible, known as a cup, to form a boule.

A serious drawback in this process has been the need to dispose of the HCl by-product in an environmentally safe manner. Accordingly, it has been proposed, in U.S. Pat. No. 5,043,002 (Dobbins et al.), to employ a halide-free, silicon-containing compound as a substitute for $SiCl_4$. In particular, the patent proposes using a polymethylsiloxane, such as octamethylcyclotetrasiloxane, to provide the vaporous reactant for the hydrolysis or pyrolysis process.

In order to introduce a substitute precursor, it is, of course, critically necessary to avoid any significant change in the properties of the fused silica product. Unfortunately, the substitution proposed by the Dobbins et al. patent did lead to significant property changes. One such change was a reduction in UV transmission properties. Another was development of fluorescence in the glass that increased when the glass was exposed to short wavelength radiation.

Studies revealed that a factor in the transmission loss was sodium ion content in the glass. U.S. Pat. Nos. 5,332,702 and 5,395,413 (Sempolinski et al.) describe remedial measures taken to reduce the sodium ion content. Essentially, these measures constituted providing a purer zircon refractory for use in constructing a furnace in which the fused silica was deposited to form a boule. In particular, it was found necessary to use dispersants, binders and water relatively free of sodium ions in producing zircon refractory components for the furnace.

An improved product was obtained by adopting the practices prescribed in the Sempolinski et al. patents. However, use of the fused silica in certain applications made it apparent that further improvements were necessary to meet the critical requirements of these applications. One such application is lenses designed for transmission of very short UV wavelength radiation from an excimer type laser. This laser emits radiation at about 193 nm and 248 nm wavelengths.

It was found that lenses produced from available fused silica did not provide acceptable transmission of the short wavelength radiation and exhibited an undesirable fluorescence. Both of these conditions tend to become worse with service time. The loss of transmission, or darkening of the glass, is commonly referred to as UV absorption damage.

It is a primary purpose of the present invention to provide a fused silica material that alleviates these problems. Another purpose is to provide an improved fused silica glass for lenses used with lasers, especially for microlithographic work. A further purpose is to provide an improved furnace for collection of the fused silica in the form of a boule. A still further purpose is to provide a method of achieving the improved collecting furnace and glass produced therein.

SUMMARY OF THE INVENTION

One aspect of the present invention resides in an improved method of producing a fused silica body by introducing a silicon-containing compound into a flame to form molten silica particles and collecting those particles in the form of a fused silica body in a furnace constructed of refractory materials, the improvement comprising constructing at least a portion of the furnace from refractory materials that have been exposed to a reactive, halogen-containing gas to react with and thereby cleanse the refractory of contaminating metals.

A further aspect of the invention resides in a relatively pure fused silica material in which the fused silica has a transmittance value of at least 99.5% for 248 nm radiation, a transmittance value of at least 98% for 193 nm radiation, at least a substantial portion of the body has an acceptable fluorescence level when exposed to such radiation, and the fused silica material has a content of contaminating metal ions less than 100 ppb.

The invention further resides in a refractory furnace for collecting molten silica particles in the form of a solid body, at least a portion of the furnace being constructed of a refractory that contains metal contaminants in an amount less than 300 ppm.

BRIEF DESCRIPTION OF THE DRAWINGS

The single FIGURE in the accompanying drawing is a schematic representation of an apparatus and process for depositing a large body of fused silica.

DESCRIPTION OF THE INVENTION

Figure 1:
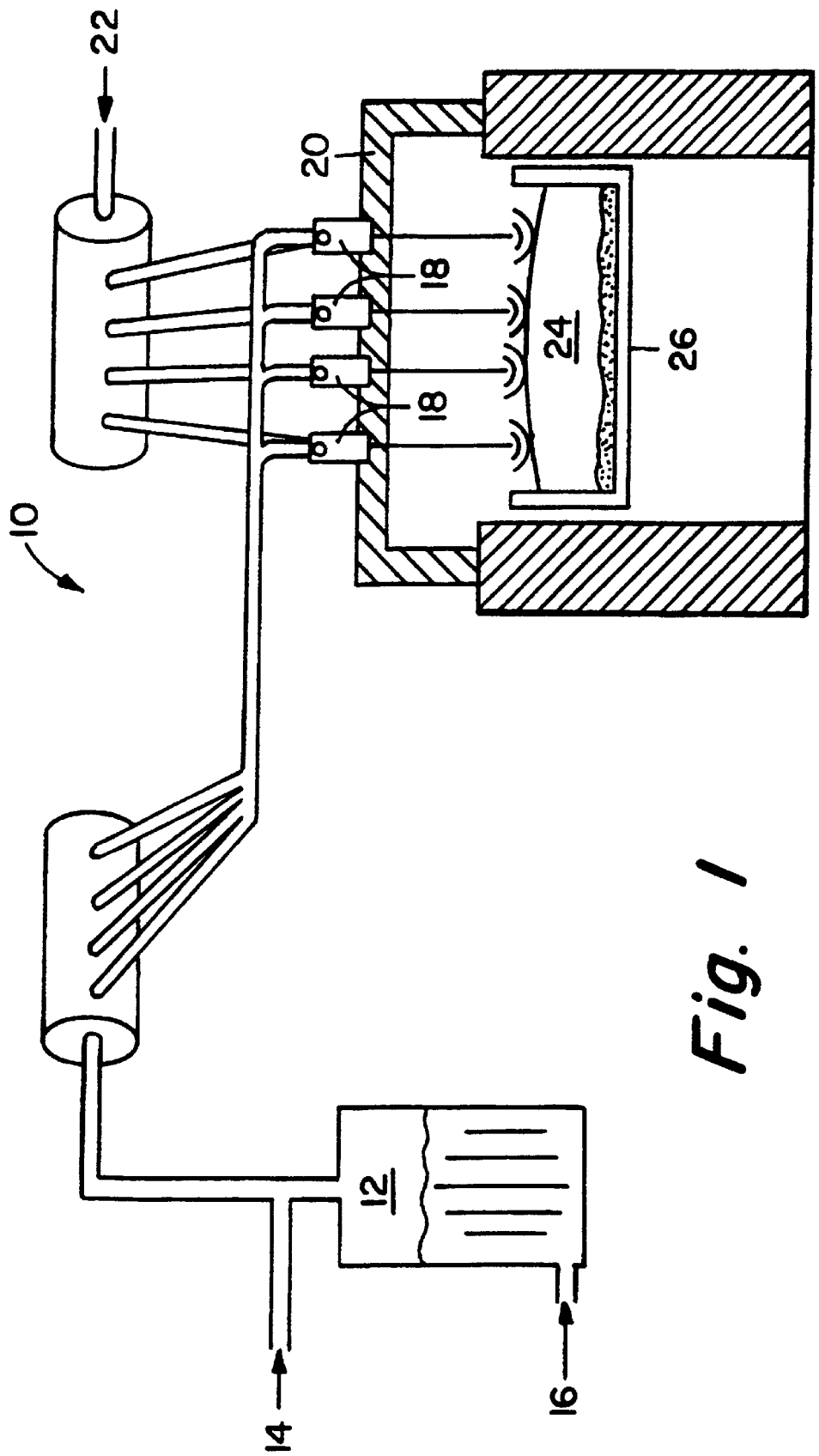

The conventional boule process used in making fused silica is a one-step process. In this process, a carrier gas is bubbled through a $SiCl_4$ feedstock that is maintained at a specified low temperature. The vaporous $SiCl_4$ is entrained in the carrier gas and is thereby transported to the reaction site. The reaction site is comprised of a number of burners that combust and oxidize the vaporous $SiCl_4$ to deposit silica at a temperature greater than 1600° C.

The principal requirements in the conventional process are that the apparatus and transfer system be capable of vaporizing the feedstock and delivering the vaporized feedstock to a burner in the vapor state. As described in the Dobbins et al. patent, the apparatus and process may remain substantially unchanged with one major exception. The $SiCl_4$ feedstock is replaced by a polymethylsiloxane. Use of this substitute feedstock may require some minor adjustments, such as a somewhat higher delivery temperature (e.g., 100–150° C.). This is due to the siloxane having a somewhat lower vapor pressure than $SiCl_4$.

FIG. 1 in the accompanying drawing is a schematic representation of an apparatus and process for producing and depositing molten silica particles to build up a large, fused silica boule. The apparatus, generally designated by the numeral 10, includes a feedstock source 12. Nitrogen, or a nitrogen/oxygen mixture, is used as the carrier gas. A bypass stream of nitrogen 14 is introduced to prevent saturation of the vaporous stream. The vaporous reactant is passed through a distribution mechanism to the reaction site wherein a number of burners 18 are present in close proximity to a furnace crown 20. The reactant is combined with a fuel/oxygen mixture 22 at these burners, and is combusted and oxidized to deposit silica at a temperature greater than 1600° C. High purity metal oxide soot and heat are directed downwardly through the refractory furnace crown 20. The silica is immediately deposited and consolidated to a non-porous mass 24 on hot cup 26.

Improvement in the zircon refractory, as disclosed in the Sempolinski et al. patents, alleviated the affect of sodium ion contamination in a fused silica article. However, it was then found that other contaminants also exist in the furnace refractory in addition to sodium. These include the alkaline earth metals, and transition metals, such as iron, titanium and lead, aluminum, phosphorous and sulfur.

These metal contaminants have varying degrees of volatility at temperatures in excess of 1650° C., the temperature at which fused silica is deposited. Thus, they may be present in the furnace atmosphere, and become entrapped in the fused silica as it is deposited. The presence of these contaminating metals in a fused silica lens results in a reduction of the transmittance capability of the glass, and also results in development of an undesirable fluorescence in the glass. These deficiencies continue to further develop as the lens is subjected to short wavelength UV radiation in service.

There are inherent variations in the metal impurity levels in a refractory material, as well as varying degrees of metal volatility. This makes it difficult to control glass quality in a fused silica collection furnace, or even to obtain acceptable glass frequently. The problem becomes particularly acute when a polysiloxane is used as a precursor material for the fused silica. As explained in the Sempolinski et al. patents, the self-cleansing action of the HCl by-product from a $SiCl_4$ decomposition is lost with the siloxane precursor.

Contaminating metals can be present in the raw materials employed in production of furnace refractories. The metals may also be entrained during sintering of the refractory, or during any subsequent operations, such as sawing or grinding. Zircon is a relatively clean refractory, particularly when prepared as described in the Sempolinski et al. patents. However, the superior transmission properties required for such demanding uses as microlithography applications require control of all metal contaminants at a level below 100 parts per billion (ppb).

We have found that this degree of contaminating metal control in a collection furnace can be achieved by constructing the furnace of refractory materials containing less than 300 parts per million (ppm) of the contaminating metals. In particular, we have found this to be true for zircon refractories used in a collection furnace for fused silica deposition. This desirable end is accomplished, in accordance with the present invention, by firing the furnace refractories in a halogen-containing atmosphere. The halogen reacts with and removes the contaminating metals from at least the exposed surface of the refractory.

We have found that chlorine or fluorine, alone or in acid gas form, to be especially useful. The cleansing gas can be used in essentially pure form. However, we have found it convenient, and effective, to employ as little as 5% of the cleansing gas in an inert gas, such as helium or argon, with a somewhat longer treatment time. The cleansing treatment may employ a continuous flow of the halogen gas. Alternatively, a pulsed type treatment may be used wherein gas is repeatedly introduced into the firing chamber and subsequently exhausted.

The cleansing action can occur at a temperature as low as 700° C. However, it is usually preferred to employ somewhat higher temperatures in the range of 1100 to 1500° C. Above 1500° C., zircon starts to thermally dissociate, thereby resulting in a weaker refractory body.

The invention is here described with reference to treatment of zircon refractory furnace elements. However, it will be appreciated that it is also applicable to cleansing contaminating metals from other types of refractory articles.

The cleansing process on a refractory body may be carried out either prior to assembly into a furnace or after assembly. The treatment may also be carried out during production of the refractory. High temperature refractories, such as zircon, are sintered in air at temperatures in excess of 1500° C. As the sintered furnace components are being cooled, the cooling step can be interrupted at an appropriate temperature, for example, 1200° C. The sintering furnace is then switched to a halogen-containing atmosphere, and the temperature maintained for the necessary time to cleanse the refractory of the contaminating metals.

The use of refractories chemically cleaned in accordance with the invention provides several advantages. The cleaner deposition furnace provides a fused silica product of high purity. It provides high, consistent yields of fused silica glass having an acceptably high transmission of short wavelength UV radiation and a low level of fluorescence. Further, the glass is less prone to increases in radiation damage and fluorescence in service. These desired ends are achieved without requiring change in, or compromise of, either the furnace design or the silica forming and deposition process. This is highly significant because these features are critical to achievement of refractive index homogeneity in the glass.

The effectiveness of the cleansing treatment was demonstrated by comparing two sets of fused silica test pieces. One set was taken from boules deposited in an untreated collection furnace. A second set was taken from boules deposited in a treated furnace. The furnaces were constructed in essentially identical design with sintered zircon refractory crowns and cup liners. The refractories in the treated furnace were soaked for eight hours in a furnace operating at 1300° C. A flowing atmosphere of 5.7% $Cl_2$ and 94.3% helium was maintained during the entire time.

Relevant properties were measured on the test pieces taken from comparable locations in the boules from the untreated furnace and those from the treated furnace. TABLE I shows internal transmittance in percent as determined on the basis of measurements for both 248 nm and 193 nm wavelength radiation.

TABLE I

|        | Untreated | Treated |
|--------|-----------|---------|
| 248 nm | 99.08     | 99.82   |
|        | 99.46     | 99.85   |
| 193 nm | 95.28     | 99.18   |

The fused silica boules described above were also analyzed to determine the percentage of boule depth that exhibited an acceptable low level of fluorescence. Fluorescence is determined by integrating the intensities measured over the range of 400–700 nm. To be acceptable, a glass test piece must exhibit a value, as so determined, that is below $4.2\times10^{-9}$ watts/cm$^2$ when the glass is exposed to an emitting laser operating at 15 mJ/cm$^2$ and 200 Hz.

Glass from the untreated furnace was completely unacceptable. There was no portion of the boule in which the fluorescence value was acceptably low. Glass from the treated furnace had acceptable glass to a depth of 3.53 inches. This represented 59.3% of the total depth.

We claim:

1. In a method of producing a fused silica body by introducing an organosiloxane into a flame to form molten silica particles and collecting those particles in the form of a fused silica body in a furnace constructed of zircon refractory, the improvement comprising exposing the zircon refractory used in the furnace to an atmosphere containing a reactive halogen gas, as a halogen or in acid gas form, reacting the halogen gas with contaminating metals in the zircon refractory to thereby remove contaminating metal ions from the zircon refractory.

2. A method in accordance with claim 1 which comprises exposing the zircon refractory to the atmosphere containing reactive halogen gas preceding assembling of said furnace constructed of said zircon refractory.

3. A method in accordance with claim 2 which comprises exposing said refractory to the reactive, halogen gas during a cooling portion of the refractory sintering cycle.

4. A method in accordance with claim 1 which comprises exposing the zircon refractory to the atmosphere containing reactive halogen gas after an assembling of said furnace constructed of said zircon refractory.

5. A method in accordance with claim 1 which comprises exposing the zircon refractory to a continuous flow of the atmosphere containing the halogen gas during the contaminant removing step.

6. A method in accordance with claim 1 which comprises exposing the zircon refractory to a pulsed treatment with the atmosphere containing the halogen gas during the contaminant removing step.

7. A method in accordance with claim 1 which comprises exposing the zircon refractory to an atmosphere containing 5–100% of the halogen gas, the remainder of the atmosphere, if any, being an inert gas.

8. A method in accordance with claim 1 which comprises exposing the zircon refractory to said halogen gas at a temperature of 700–1500° C.

9. A method in accordance with claim 8 which comprises exposing the zircon refractory at a temperature in the range of 1100–1500° C.

10. A method in accordance with claim 1 which comprises reducing the concentration of contaminating metal ions in the zircon refractory to less than 300 ppm.

* * * * *